US006981911B2

(12) United States Patent
Martina

(10) Patent No.: US 6,981,911 B2
(45) Date of Patent: Jan. 3, 2006

(54) ABRASIVE DRILL BIT

(76) Inventor: Jose-Maria Vidal Martina, Jr. Garcia Garcia N. 234, La Puntas - Callao, Lima (PE)

(*) Notice: Subject to any disclaimer, the term of this patent is extended or adjusted under 35 U.S.C. 154(b) by 0 days.

(21) Appl. No.: 10/424,967

(22) Filed: Apr. 28, 2003

(65) Prior Publication Data

US 2003/0228835 A1 Dec. 11, 2003

Related U.S. Application Data

(63) Continuation of application No. 09/817,648, filed on Mar. 26, 2001, now abandoned.

(51) Int. Cl.
*B23B 49/00* (2006.01)

(52) U.S. Cl. ......................... 451/547; 451/41; 451/342; 451/359; 408/72 R; 408/103; 408/115 R

(58) Field of Classification Search ................. 451/342, 451/359, 60, 547, 41; 408/72 R, 115 R, 103
See application file for complete search history.

(56) References Cited

U.S. PATENT DOCUMENTS

| | | | | | |
|---|---|---|---|---|---|
| 649,488 | A | | 5/1900 | Schrader | |
| 1,297,889 | A | | 3/1919 | Miller | |
| 1,406,185 | A | | 2/1922 | Hansen | |
| 1,420,365 | A | | 6/1922 | Chapman | |
| 1,540,365 | A | | 8/1925 | Ross | |
| 2,329,393 | A | * | 9/1943 | Davis | 175/315 |
| 3,583,383 | A | | 6/1971 | Ovshinsky | 125/20 |
| 4,843,766 | A | * | 7/1989 | Umeda | 451/69 |
| 5,069,584 | A | * | 12/1991 | Obermeier et al. | 408/145 |
| 5,140,527 | A | * | 8/1992 | Jones et al. | 702/27 |
| 5,222,845 | A | * | 6/1993 | Goldstein et al. | 408/103 |
| 5,423,719 | A | | 6/1995 | Jennings | 451/540 |
| 5,527,206 | A | | 6/1996 | Sjolander et al. | 451/342 |
| 5,800,099 | A | * | 9/1998 | Cooper | 408/1 R |
| 5,915,891 | A | * | 6/1999 | Fridman | 408/1 R |
| 5,954,461 | A | * | 9/1999 | Lemieux | 408/115 R |
| 5,983,445 | A | | 11/1999 | Baker | 15/339 |
| 5,988,954 | A | | 11/1999 | Gaskin et al. | 408/67 |
| 5,996,571 | A | | 12/1999 | Jedick | 125/20 |
| 6,050,753 | A | | 4/2000 | Turner | 408/88 |
| 6,186,707 | B1 | * | 2/2001 | Kain | 408/1 R |
| 6,193,449 | B1 | * | 2/2001 | Diaz | 408/115 R |
| 6,254,320 | B1 | * | 7/2001 | Weinstein et al. | 408/103 |
| 6,394,713 | B1 | * | 5/2002 | Yates, Sr. | 408/115 R |
| 6,413,151 | B2 | * | 7/2002 | Mizuno et al. | 451/41 |
| 6,481,937 | B1 | * | 11/2002 | Sommerfeld et al. | 408/115 R |
| 2002/0122706 | A1 | * | 9/2002 | Chen | 409/206 |

* cited by examiner

*Primary Examiner*—Lee D. Wilson
*Assistant Examiner*—Anthony Ojini
(74) *Attorney, Agent, or Firm*—Wood, Herron & Evans, L.L.P.

(57) ABSTRACT

An abrasive drill bit and method of use on glass, ceramics, tile, stone and similar solid materials, both natural and synthetic. A circle is ground into the material using a cylindrical drill bit, which grinds a loose abrasive between the bit cylinder and the material. When the circle is complete, a punch-out piece of the material falls out, leaving a smooth hole. Alternatively, the loose abrasive is ground between a solid bit and the material to grind out a hole. In both methods, the loose abrasive is preferably mixed with water to form a slurry.

16 Claims, 4 Drawing Sheets

ABRASIVE DRILL BIT

RELATED APPLICATION

This application is a continuation of application Ser. No. 09/817,648, filed Mar. 26, 2001 now abandoned , the disclosure of which is incorporated herein in its entirety by reference.

BACKGROUND OF THE INVENTION

1. Field of the Invention

This invention relates to a method and system for drilling holes in ceramic and glass material. Specifically, the invention describes an abrasive drill bit that produces a smooth hole in ceramic and glass without cracking or chipping the ceramic.

It is understood that the terms “ceramic”, “tile”, “glass”, “stone” and like terms are used interchangeably as relating to this invention, which works well when drilling holes in all such similar materials. Likewise, these terms are used interchangeably when describing prior art, unless otherwise noted.

2. Related Art

There are presently two main methods of making a hole in tile: breaking and drilling.

Breaking has been the method of choice in construction, especially in plumbing installation and repair. To access plumbing, a hole is created by breaking through the tile with a small hammer and/or chisel. The best results of this method are a jagged hole; the worst results are a cracked or shattered tile that must be replaced. This technique always requires some type of cover to cover the jagged edges of the hole and to provide an air block around the hole, since a tight seal around the plumbing is difficult if not impossible. The breaking technique is not possible when dealing with crystalline structures such as glass and many crystalline stones, which will simply shatter if struck with a chisel of similar tool.

Drilling a hole into glass and tile has been possible using a diamond or carbide tipped drill bit 100, also referred to as a “tungsten arrow”, such as seen in FIG. 1A (prior art). The carbide tip 110 of carbide drill bit 100 is typically a diamond-lapped or tungsten tip that is spear shaped and able to drill through the glass. The user of carbide tipped drill bit 100 must carefully align and brace the drill that is turning the bit through the use of a special jig. This jig ensures proper alignment of the tip for drilling through the glass and with adequate pressure. Thus, drilling with carbide tipped drill bit 100 is not feasible in the field, due to this required special equipment and orientation. Another limitation of this drill bit is its expense. Another limitation is its small diameter, as standard sized carbide tipped drill bits are less than ½" in diameter. Additionally, the finished hole produced with carbide tipped drill bit 100 usually has sharp edges, which must be smoothed off with an emery cloth or other tool, posing a cutting hazard during the smoothing off process.

To drill larger holes, such as over 1" in diameter, in ceramic and glass material, the typical modem method in the prior art uses a diamond coated box drill bit 120, as shown in FIG B (prior art). Segment tips 125 are coated with diamond, and can cut through glass when properly aligned with a press drill. Box drill 120 must be continuously cooled during use, typically with antifreeze or other liquid capable of removing the high amounts of heat produced. Failure to do so may result in cracking of the glass and/or damage to the bit, which is expensive. While this method may be useful in a shop, such as that of a lamp maker, glass worker and the like who must drill holes in ceramic for wiring, switches, etc., it is not feasible in plumbing operations, due to the required alignment jib, mess of the coolant, etc.

It would therefore be useful improvement of the prior art for a device and method to drill holes, including large diameter (greater than 1") holes, in glass, ceramics, tile and like materials, using a standard electric drill without a cumbersome jig.

BRIEF SUMMARY OF THE INVENTION

Accordingly, the objectives of this invention are to provide, inter alia, a new and improved device and method of forming a hole in glass, tile, ceramics and similar materials that is capable of:

using a bit that can be used in a standard electric drill;

not requiring special lubricants;

being used on the jobsite away from the user’s shop or plant;

forming a smooth hole that does not need to be polished after drilling; and being cost efficient.

These objectives are addressed by the structure and use of the inventive abrasive drill bit. The device typically chucks to a standard electric hand-held drill. The bit is a cylinder with a sponge type material or a sweeping rubber flap in its interior. Water and abrasive is mixed in the interior of the guide hole, and optionally additional abrasive and/or water may be added through a top opening in the cylinder when the bit is still. The bit is preferably aligned with a guide, which is placed against the material to be drilled. The abrasive weeps through holes in the sides of the bit cylinder, and the bottom edge of the cylinder traps and presses the abrasive against the glass or similar solid material to grind a cut-out hole in the material. The final hole size is limited only by the diameter of the abrasive cylinder bit, and typically can range from ½" to over 4", although other sizes are also practical. The cut-out hole typically has smooth edges without sharp cutting edges along the rim.

Other objects of the invention will become apparent from time to time throughout the specification hereinafter disclosed.

DETAILED DESCRIPTION OF THE INVENTION

Figure 7:
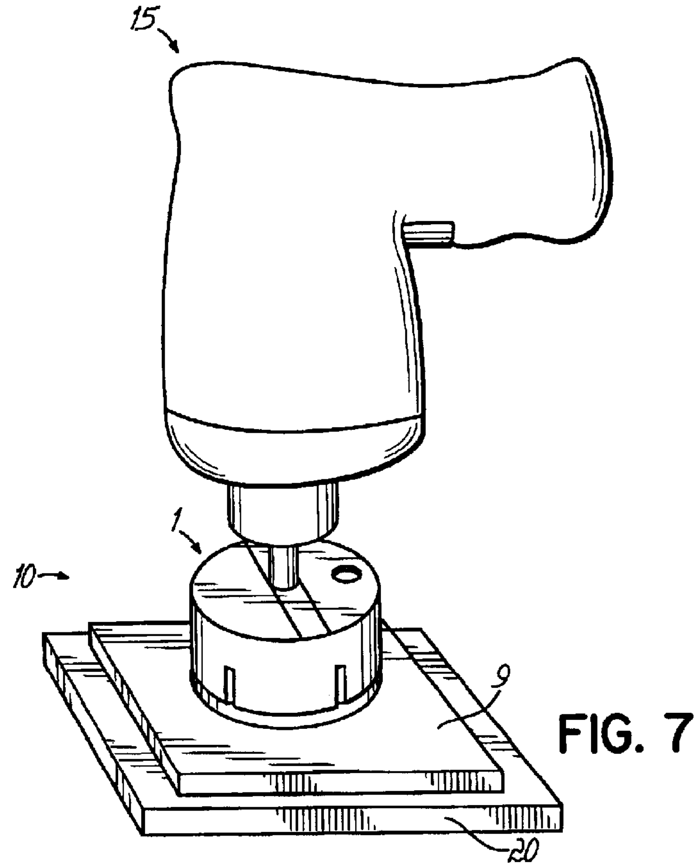
FIG. 7 depicts the inventive abrasive system, comprising the drill bit attached to a drill and positioned in the drilling guide on a piece of glass.

The present invention is described abrasive cylinder bit 1. In the preferred embodiment, abrasive cylinder bit 1 is used in abrasive system 10, comprising drill 15, abrasive cylinder bit 1 and guide 9, as depicted in FIG. 7.

Figure 1A:
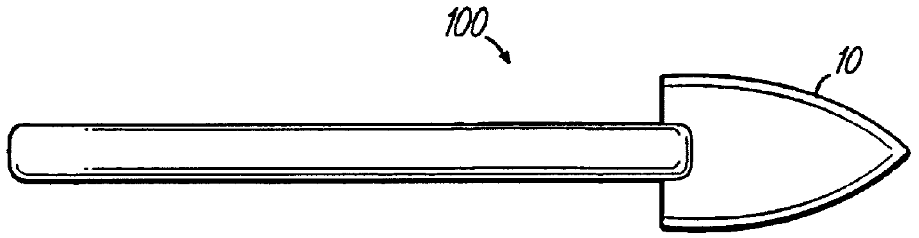
FIG. 1A PRIOR ART
FIGS. 1A and 1B depict prior art drill for glass and ceramics.
Figure 1B:
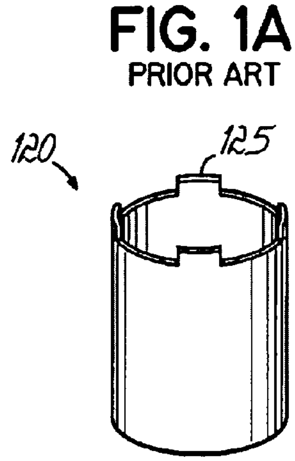
FIG. 1B PRIOR ART
Figure 2:
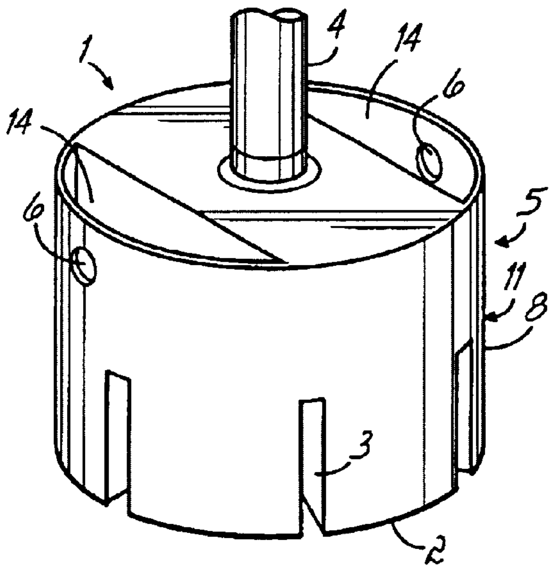
FIG. 2 depicts a large diameter abrasive drill bit.
Figure 3:
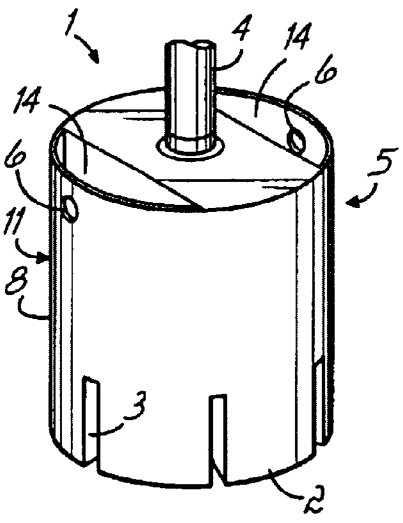
FIG. 3 depicts a smaller diameter abrasive drill bit.

Abrasive cylinder bit 1 is depicted in a larger diameter version in FIG. 2, and a smaller diameter version in FIG. 3. The larger diameter version is typically greater than 2" in diameter, and the smaller version is typically less than 2" in diameter. Otherwise, the two bits 1 are structurally the same.

Figure 4:
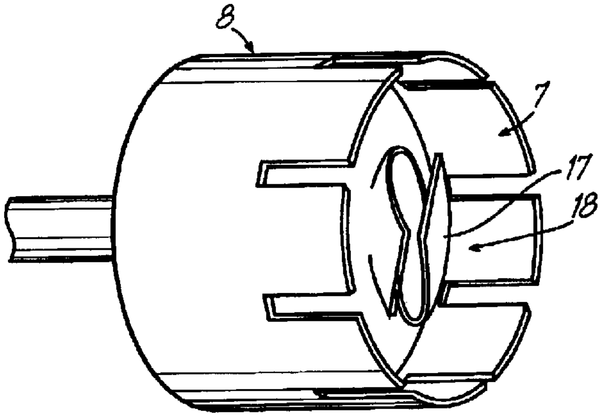
FIG. 4 depicts the interior of the inventive abrasive drill bit.

Abrasive cylinder bit 1, as depicted in FIGS. 2–4, comprises a connection means to a drill, said connection means typically comprising connection shaft 4, which is permanently mounted to the center of cylinder base 5 of cylinder 11. Alternatively, the drill connection means may be a socket hole (not shown) for receiving a socket stem or shaft (not shown), such as found in prior art socket wrenches. Cylinder 11 is preferably made of a hard metal that is resistant to heat and erosion inherent in the grinding/abrasion process. Inlet hole 6 traverses through cylinder base 5, preferably near the perimeter of cylinder base 5. In the preferred alternative, cylinder base 5 is interrupted, and comprises one or more base cavities 14, as depicted in FIG. 3. In either embodiment, cylinder base 5 attaches to cylinder side 8, which has cylinder edge 2 distal from cylinder base 5. Cylinder edge 2 preferably is smooth, having no teeth or other irregular surface. Abrasive slots 3 traverse through cylinder side 8 from cylinder edge 2 toward cylinder base 5. In the preferred embodiment, abrasive slots 3 extend from cylinder edge 2 to a position ⅓ to ½ up the length of cylinder side 3.

Figure 5:
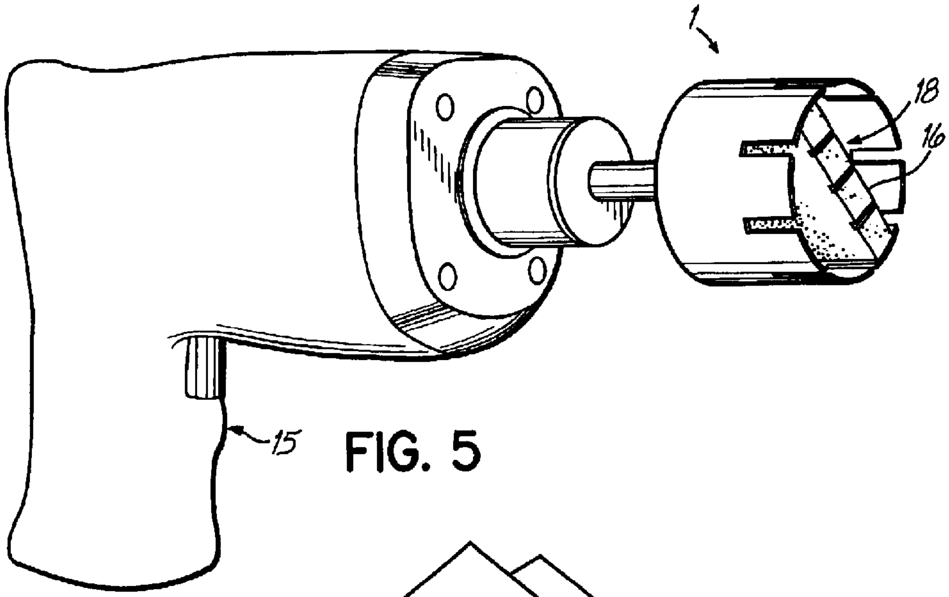
FIG. 5 depicts the inventive drill bit attached to a standard electric drill.

Cylinder 11 has cylinder interior 7. Oriented within cylinder interior 7 is sweeping material 18 for directing abrasive material toward cylinder edge 2. In the preferred embodiment, sweeping material 18 may be soft flap 17 as shown in FIG. 4, or it may be sponge 16 as depicted in FIG. 5. Any material capable of moving abrasive material outward as described may be used.

Figure 6:
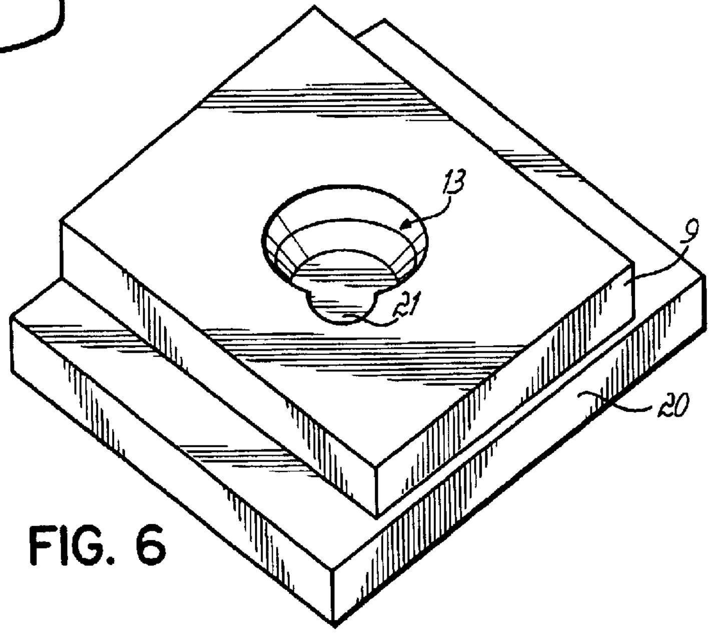
FIG. 6 depicts the drilling guide positioned on a piece of glass.
Figure 8A:
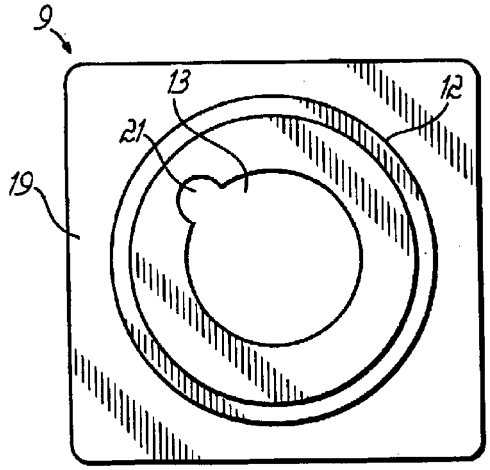
FIGS. 8A and 8B depict a preferred embodiment of the drilling guide.
Figure 8B:
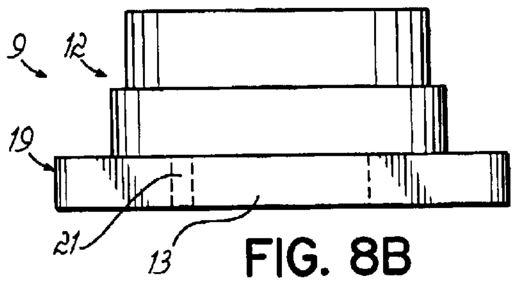

Guide 9, as depicted in FIG. 6 while positioned on a piece of glass 20, comprises guide hole 13, which affords a guide for abrasive cylinder bit 1. In the preferred embodiment shown in FIGS. 8A (top view) and 8B (side view), guide hole 13 has abrasive material relief reservoir 21. Abrasive material relief reservoir 21 allows abrasive material slurry to cycle from cylinder interior 7 into abrasive material relief reservoir 21 and back again into cylinder interior 7 and/or abrasive slots 3. This provides both a more even distribution and coating of the abrasive material on cylinder edge 2, and also aids in cooling the abrasive material.

Figure 9A:
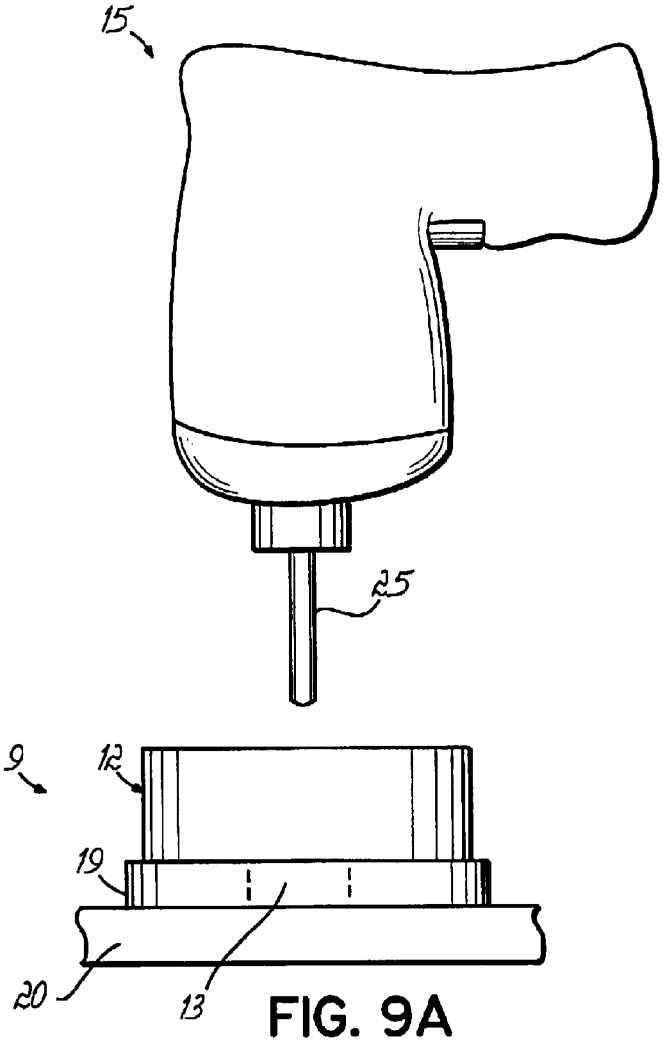
FIGS. 9A and 9B depict an alternate solid grinding bit.
Figure 9B:
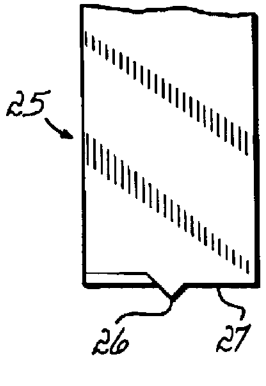

Alternatively, a hole may be ground in glass 20 using abrasive shaft bit 25, as depicted in FIG. 9A. Shown in greater detail in FIG. 9B, abrasive shaft bit 25 has a grinding surface 27 at its tip. Abrasive shaft bit 25 may be a solid cylindrical shaped shaft, or it may have a cylindrical first end for attaching to drill 15 and a flattened second end comprising grinding surface 27. In either embodiment, bit point 26 is preferably oriented at the tip of abrasive shaft bit 25 to provide an initial pilot depression in glass 20 about which abrasive shaft bit 25 rotates to grind through glass 20 to form a hole. While there are no absolute range limits on the use of this alternate solid bit, the preferred hole sizes to be ground out are less than 1".

Operation

FIG. 7 depicts abrasive system 10, the preferred embodiment of the use of abrasive bit 1. Abrasive bit 1 is chucked into drill 15 at connection shaft 4. Guide 9 is then placed flat on glass 20, which may be any vitreous material, including glass, tile, and ceramic, as well as concrete, Formica™, natural or synthetic stone or similar material. To minimize breakage, glass 20 is preferably placed on a vibration absorbing material, such as soft wood, carpeting, hard rubber, etc. Alternatively, glass 20 may be tile mounted on a wall, in which case guide 9 is simply held against glass 20.

Abrasive material, such as emery powder, zirconium powder, aluminum oxide mixed with or without titanium, or any other similar abrasive material, is placed into the bottom of guide hole 13 and mixed with a small amount of water, to form a slurry having a consistency thin enough to migrate into abrasive slot 3 while thick enough to have adequate abrasive qualities. Abrasive bit 1 is placed into guide hole 13 such that abrasive bit 1 is flush against glass 20, preferably with cylinder edge 2 parallel with and connection shaft 4 normal to the surface of glass 20. Optionally, additional abrasive material may be placed, typically poured or injected, into cylinder interior 7 through inlet hole 6 or base cavity 14. In an alternative embodiment, the abrasive material is scavenged for re-use using ordinary collection and/or absorption means.

Drill 15 is then switched on to turn abrasive bit 1, preferably at high speed. The abrasive material is ground between cylinder edge 2 and glass 20, cutting a circle into glass 20. Abrasive material in cylinder interior 7 is pushed outward towards cylinder edge 2 into abrasive slots 3. Additionally, abrasive material is pushed under cylinder edge 2 due to the inherent offset between cylinder edge 2 and the surface of glass 20. This abrasive material is forced towards cylinder edge 2 by the combined centrifugal force of the turning abrasive bit 1 while the abrasive material is "swept" off the surface of glass 20 by sponge 16, or alternatively soft flap 17, and directed towards cylinder edge 2. Where abrasive material relief reservoir 21 is part of guide 9, the abrasive material migrates from cylinder interior 7 through abrasive slots 3 into abrasive material relief reservoir 21. The abrasive material in abrasive material relief reservoir 21 also is cycled back through the abrasive slots 3 and under cylinder edge 2 to provide uniform abrasive material to cylinder edge 2. Additional abrasive material can be added by removing abrasive bit 1 from the partially cut circle and placing additional abrasive material into guide hole 13, or by injection of the abrasive material into cylinder interior 7 thorough inlet hole 6 or base cavity 14.

The circle extends through glass 20, creating a punch-out disk of glass 20 that then falls out, or alternatively can be pushed or punched out of cylinder interior 7 by pushing out the side with a rod or similar pusher.

Alternatively, in thicker glass, after the circle ground by abrasive bit 1 is preferably approximately ⅔ through glass 20, guide 9 is repositioned on the opposite side of glass 20 over the circle, assuming glass 20 is transparent or translucent to allow such alignment. A second circle is then ground through glass 20 until it meets up with the first side's circle. This alternative method allows the abrasive material to flow in and out of abrasive material relief reservoir 21, since this reservoir is too far above cylinder edge 2 to allow cycle backflow under cylinder edge 2.

It is preferred that abrasive bit 1 periodically be removed from the ground circle during the grinding process and washed with water to allow for periodic cooling and to add additional abrasive material. In this preferred embodiment, the grinding process is suspended periodically, typically every minute, abrasive bit 1 is removed from the cut circle, guide 9 (when used) is removed, and the surface of glass 20 and the partially cut circle washed off with water. This washing removes cuttings form the abrasive/water slurry. As more cuttings become part of the abrasive/water slurry, the abrasive/cutting properties of the slurry decreases since abrasive material becomes a less and less percentage of the slurry, having been "diluted" by the cuttings. After washing out the circle, guide 9 (where used) is replaced, and new abrasive material is placed in guide hold 13 along with a small amount of water, abrasive bit 1 reinserted into the partially cut circle, and grinding resumes.

The foregoing method is best performed on a horizontal fixed or secured glass 20, which again can be any vitreous material or similar hard solid, including but not limited to glass, tile, ceramic, stone, or any hard crystalline material. The method can also be used on non-horizontal surfaces, such as drilling holes in a tile wall for plumbing access. The method is the same, with additional care taken to press or secure guide 9 against the tile, and to ensure sufficient abrasive material is in cylinder interior 7 and/or guide hole 13 for adequate abrasive action in the circle being cut. Typically, the abrasive material is thicker to maintain consistency within cylinder interior 7.

In all embodiments of the grinding method, it is preferred that only light pressure be allowed to press down on cylinder edge 2. The abrasive material should be allowed to migrate under cylinder edge 2 between cylinder edge 2 and glass 20. If heavy pressure is applied to abrasive bit 1 and cylinder edge 2, the abrasive material is pushed out of the interface area between cylinder 1 and cylinder edge 2, and the abrasive/grinding ability of the abrasive material is lost.

While the preferred embodiments described above use guide 9 to align abrasive bit 1 flush against glass 20, abrasive bit 1 and drill 15 can also be used without guide 9 by carefully aligning cylinder edge 2 flush against the surface of glass 20. This method is not preferred, since the amount of abrasive material lost is increased due to slinging and leakage of the abrasive material.

Use of the alternate abrasive shaft bit 25 is similar to the operation of abrasive cylinder bit 1. Abrasive material, usually a slurry of abrasive material and water, is placed in guide hole 13. Abrasive shaft bit 25 is connected at its first end to drill 15. The second end of abrasive shaft bit 25 comprises grinding surface 27 and bit point 26. Bit point 26 "digs" or "bites" into glass 20, to stabilize the position of abrasive shaft bit 25 in the location and normal orientation to glass 20 desired. Drill 15 is energized, rotating abrasive shaft bit 25 and grinding surface 26. Abrasive material between grinding surface 26 and the surface of glass 20 grinds out a hole in glass 20. The grinding continues until the hole is through glass 20.

Note that abrasive cylinder bit 1 described above forms a circle that forms a disk that is removed from glass 20, leaving the hole. Abrasive shaft bit 25 grinds out the entire hole in glass 20, requiring a greater surface area to be ground compared to that of abrasive cylinder bit 1. Thus, while either method and device may be used for smaller holes (typically less than 1" in diameter), abrasive cylinder bit 1 is preferable for holes larger than 1" in diameter.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A method of forming a hole in a solid material, said method comprising:

orienting a guide on a surface of said solid material;

placing an abrasive material in a guide hole of said guide;

placing an abrasive cylinder bit into said guide hole of said guide, said abrasive cylinder bit comprising a cylinder and a connection means, said cylinder comprising a cylinder base, a cylinder side and a cylinder edge distal said cylinder base, said connection means being connected to a drill;

energizing said drill to rotate said abrasive cylinder bit; and grinding a circle through said solid material by grinding said abrasive material between said cylinder edge of said abrasive cylinder bit and said solid material.

2. The method as in claim 1, further comprising:

sweeping said abrasive material located within an interior of said abrasive cylinder bit towards said cylinder edge.

3. The method as in claim 1, further comprising:

sweeping said abrasive material into at least one abrasive slot oriented on said cylinder side and proximate said cylinder edge.

4. The method as in claim 3, further comprising:

receiving said abrasive material into an abrasive material relief reservoir, said abrasive material relief reservoir being oriented proximate and lateral to said guide hole; and cycling said abrasive material between said cylinder interior and said abrasive material relief reservoir.

5. The method as in claim 1, further comprising:

stopping said grinding step when said circle is approximately ⅔ through said material;

repositioning said guide on an opposite side of said material while aligned with said circle; and grinding on said opposite side of said material to complete said hole.

6. The method as in claim 1, wherein said solid material is oriented in a non-horizontal plane.

7. The method as in claim 1, further comprising:

ceasing said grinding step periodically before said circle is through said solid material;

washing out said circle;

reapplying said abrasive material in said guide hole; and resuming said grinding step.

8. The method as in claim 1, further comprising:

mixing water with said abrasive material to form an abrasive slurry.

9. A method of forming a hole in a solid material, said method comprising:

placing an abrasive material proximate a cylinder edge of an abrasive cylinder bit, said abrasive cylinder bit comprising a cylinder and a connection means, said cylinder comprising a cylinder base, a cylinder interior, a cylinder side and said cylinder edge distal said cylinder base, said connection means being connected to a drill;

orienting said cylinder edge bit against a surface of said solid material;

energizing said drill to rotate said abrasive cylinder bit; and grinding a circle through said solid material by grinding said abrasive material between said cylinder edge of said abrasive cylinder bit and said solid material.

10. The method as in claim 9, further comprising:

placing said abrasive material within said interior of said cylinder; and sweeping said abrasive material located within said interior of said cylinder interior towards said cylinder edge.

11. The method as in claim 9, further comprising:

placing said abrasive material within said interior of said cylinder; and sweeping said abrasive material into at least one abrasive slot oriented on said cylinder side and proximate said cylinder edge.

12. The method as in claim 9, wherein said solid material is oriented in a non-horizontal plane.

13. The method as in claim 9, further comprising:

ceasing said grinding step periodically before said circle is through said solid material;

washing out said circular hole;

reapplying said abrasive material proximate said cylinder edge; and resuming said grinding step.

14. A method of forming a hole in a solid material, said method comprising:

orienting a guide on a surface of said solid material;

placing an abrasive material in a guide hole of said guide;

placing an abrasive shaft bit into said guide hole of said guide, said abrasive shaft bit comprising a shaft having a first and second end, said first end connected to a drill and said second end comprising a grinding surface;

energizing said drill to rotate said abrasive shaft bit; and grinding a hole through said solid material by grinding said abrasive material between said grinding surface of said abrasive shaft bit and said solid material.

15. The method as in claim 14, further comprising:

initializing and stabilizing said abrasive shaft bit against said solid material with a bit point oriented proximate said grinding surface and aligned on a central vertical axis of said shaft.

16. The method as in claim 14, further comprising:

mixing water with said abrasive material to form an abrasive slurry.

* * * * *